United States Patent [19]
Capik et al.

[11] Patent Number: 6,120,052
[45] Date of Patent: Sep. 19, 2000

[54] OPTICALLY GUIDED TRAILER HITCHING SYSTEM

[76] Inventors: Dan Capik, P.O. Box 96; Adair Brown, Star Rte. 16, both of Davis Creek, Calif. 96108

[21] Appl. No.: 09/007,569

[22] Filed: Jan. 15, 1998

[51] Int. Cl.⁷ .................................................. B60D 13/00
[52] U.S. Cl. .................... 280/477; 280/DIG. 14; 340/431
[58] Field of Search ................ 280/477, 478.1, 280/504, 511, DIG. 14; 340/431, 435, 436

[56] References Cited

U.S. PATENT DOCUMENTS

| | | |
|---|---|---|
| 4,552,376 | 11/1985 | Cofer . |
| 4,852,901 | 8/1989 | Beasley et al. . |
| 4,938,495 | 7/1990 | Beasley et al. . |
| 5,108,123 | 4/1992 | Rubenzik ................................ 280/477 |
| 5,191,328 | 3/1993 | Nelson . |
| 5,285,205 | 2/1994 | White . |
| 5,455,557 | 10/1995 | Noll et al. . |
| 5,513,870 | 5/1996 | Hickman . |
| 5,657,175 | 8/1997 | Brewington . |
| 5,729,194 | 3/1998 | Spears et al. ............................ 340/431 |
| 5,923,243 | 7/1999 | Bleiner ................................... 340/435 |

*Primary Examiner*—Matthew C. Graham
*Assistant Examiner*—Pamela J. Lipka
*Attorney, Agent, or Firm*—John P. O'Banion

[57] ABSTRACT

A tow hitch alignment apparatus having a pair of light sources that emit different colored light beams. The light sources are positioned such that, when the trailer hitch components are in proper position for engagement, both light beams intersect at the target location and emit a the third colored light, which indicates to the driver that the tow vehicle is in the proper position for coupling with the trailer. In an alternate embodiment, the tow vehicle has a horizontal sensor plate embedded with photoelectric cells adjacent the tow ball which detects the approach of the tow hitch from the trailer. A laser emitter is placed adjacent the trailer hitch and directed at a pre-focused position. As the tow ball approaches the hitch, laser light from the emitter strikes various photoelectric cells on the sensor plate, which is in connection with a display within the driver's compartment. The display provides information and guides the driver regarding the tow vehicle's path towards the trailer hitch.

9 Claims, 9 Drawing Sheets

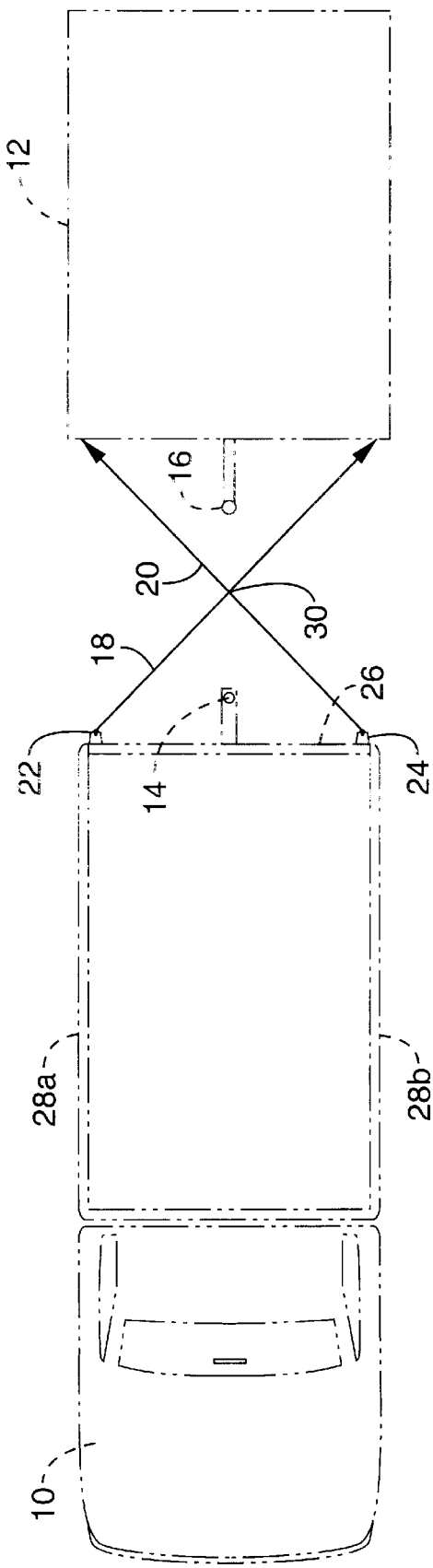
FIG. − 1A

OPTICALLY GUIDED TRAILER HITCHING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to trailer hitching aids, and more particularly to an optical guidance system which assists a driver to accurately maneuver a tow vehicle toward a trailer hitch connecting position.

2. Description of the Background Art

Hitching a trailer vehicle to a tow vehicle can be a difficult and time consuming task as the hitching components or other coupling means of the two vehicles are not in view of the driver of the tow vehicle as it is being maneuvered into position for coupling with the trailer. As a result, the driver of the tow vehicle has to back the tow vehicle toward the trailer's hitch by estimating its location and direction relative to the location of the tow hook or ball on the tow vehicle. This requires the driver to repeatedly exit the tow vehicle to check the alignment and distance between the hitching components, which is an inconvenient and time consuming process. Alternatively, the driver may enlist the assistance of another person or "spotter" who is situated outside the tow vehicle to provide directions to the driver as to the appropriate action to align and couple the trailer hitching components. When no other person is available for such assistance, the driver is left to attempt hitching the trailer to the tow vehicle using the time consuming process previously described. Additionally, neither of these methods of hitching a tow vehicle are as accurate or convenient as when the driver receives immediate visual feedback regarding trailer hitch and tow hook alignment while operating the tow vehicle.

Numerous types of trailer hitching aids have been devised, some examples of which range from mechanical linkages between vehicles to proximity sensors with alarms and to targeted light beams. One such system consists of an infrared light detector and two ultrasonic sound detectors mounted on the back of the towing vehicle, and transmitters are mounted on the front of the trailer. This system allows distances and angles to be determined by measuring the velocity differences of the signals, providing the data from the signals into a microcomputer which performs the calculations using a software program. However, the need for a microcomputer running a software program renders this system unnecessarily complex and expensive.

Another system consists of two light emitters mounted on a trailer. One light emitter sends a signal to the back of the towing vehicle. The towing vehicle has several sensors that indicate lateral alignment, and a display is provided in the passenger compartment of the vehicle to give an indication of position. The other light emitter points downward from the hitch and gives an indication of when the hitch is over the ball for coupling. The alignment sensors utilize microelectronic circuits to sense the light beam and to determine its alignment. Unfortunately, the use of the microelectronic circuits wired to the display in the passenger compartment requires extensive installation time and equipment cost.

A third such system uses a single light mounted on the hitch of the trailer and a translucent target mounted on the back of the tow vehicle. The driver looks back at the target when backing up and, when the light hits the "bullseye" portion of the target, the driver knows that the hitch is aligned. The light beam position is initially set up when the trailer hitch is coupled so that the light shines on the "bullseye". The source light mounted atop the trailer hitch increases the obtrusiveness of the system and unnecessarily subjects the light to theft and/or damage.

Accordingly, there exists a need for an easily adaptable and relatively inexpensive vehicle hitching system to assist the driver of a tow vehicle during a trailer hitching process that provides immediate feedback to the driver regarding the alignment and distance off center between the hitching components. The present invention satisfies this need, as well as others, and overcomes the deficiencies found in prior technology.

BRIEF SUMMARY OF THE INVENTION

The present invention generally comprises an apparatus and method for emitting a pair of narrowly focused light beams from the back of a tow vehicle at either the bumper level or the cab level. The light beams are of different colors and are angled in relation to the longitudinal axis of the vehicle so that when the beams intersect on a reflective surface, a resulting third colored light is emitted. A target location is placed on the trailer such that, when the trailer hitch and trailer ball are in proper alignment for engagement, both light beams intersect at the target location and emit the third colored light. The third colored light indicates to the driver that the tow vehicle and the trailer are in the proper position for coupling. The light sources can be lasers, incandescent lights or LED's combined with collimators, other sources of highly collimated beams of light.

To facilitate viewing the emission of the third colored light, especially in sunlight, a strip of reflective material is placed over the target location. The target location can also comprise a horizontal bar which provides feedback to the driver regarding the relative distance and direction of the separation between the hitching components on the tow vehicle and the trailer. If the beams intersect at a point either to the left or to the right off from the center of the horizontal bar, this indicates to the driver that the tow vehicle is to the left or to the right of the trailer, respectively. The relative distance away from the center of the horizontal bar the beams intersect provides information regarding the relative separation between the hitching components, thus enabling the driver to make the necessary course corrections.

As a variation, the tow vehicle is equipped with a horizontal sensor plate adjacent the tow ball which detects the approach of the tow hitch from the trailer. The sensor plate is embedded with numerous photoelectric cells adapted to detect laser light. The tow ball is also equipped with a sensor. A laser emitter is placed adjacent the trailer hitch and directed at a pre-focused position. As the tow ball approaches the hitch, laser light from the emitter strikes various photoelectric cells on the sensor plate, which is in connection with a display within the driver's compartment. The display, which comprises an array of LED's in communication with the specific photoelectric cells, provides information and guides the driver regarding the tow vehicle's path towards the trailer hitch. The LED in the center of the display corresponds to the sensor on the tow ball and lights up when the trailer hitch is directly over the tow ball.

An object of the invention is to provide a compact, easily installed trailer hitching guide system which is reliable and simple to use.

Another object of the invention is to provide a trailer hitching system which provides immediate feedback to the driver when the hitching components are aligned.

Another object of the invention is to provide a trailer hitching guide system which uses optical beams for indicating alignment and positioning of the trailer relative to the tow vehicle.

Yet another object of the invention is provide to an optically guided trailer hitching system which provides feedback indicating alignment and positioning of the trailer relative to the tow vehicle.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 1A is a top plan schematic view of an optically guided trailer hitching system in accordance with the present invention showing a tow truck and trailer in position to be hitched.

DETAILED DESCRIPTION OF THE INVENTION

Figure 1B:
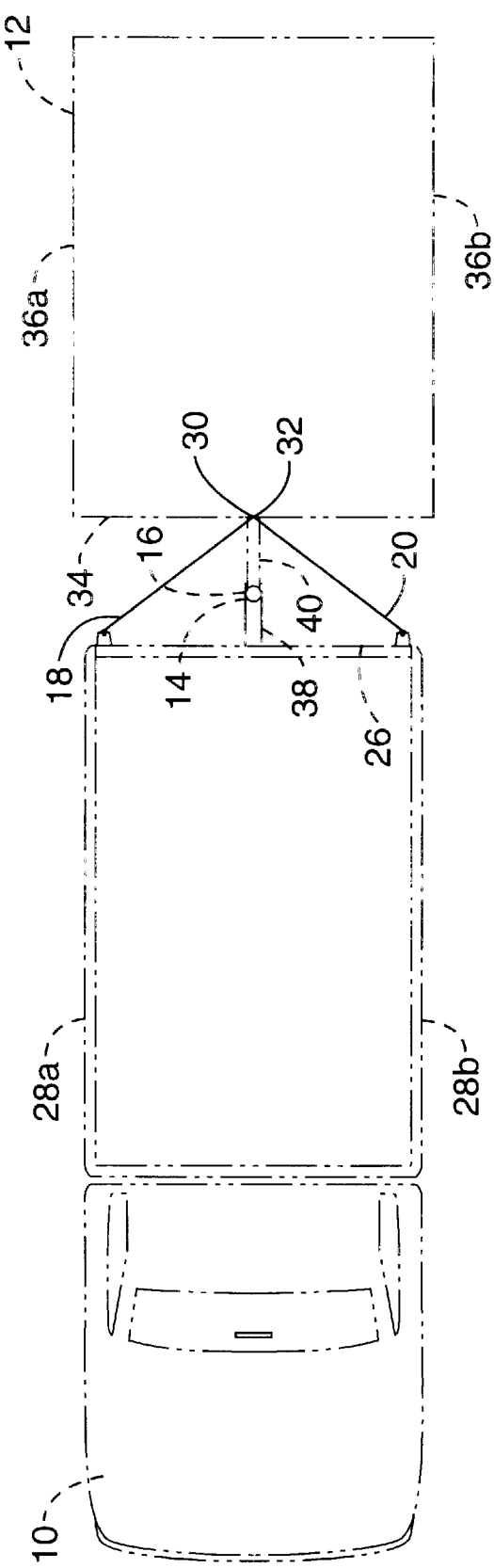
FIG. 1B is a top plan schematic view of an optically guided trailer hitching system in accordance with the present invention showing a tow truck and trailer in a proper hitching position.

Referring more specifically to the drawings, for illustrative purposes the present invention is embodied in the apparatus generally shown in FIG. 1A through FIG. 9, where like reference numbers denote like parts. It will be appreciated that the apparatus may vary as to configuration and as to details of the parts without departing from the basic concepts as disclosed herein.

Referring first to FIG. 1A, a tow vehicle 10 is shown in a position apart from a trailer 12 prior to engagement of a tow ball 14 on tow vehicle 10 to a tow hitch 16 on trailer 12. A first light beam 18 having a first color is directed in a rearward direction from tow vehicle 10. A second light beam 20 having a second color is also directed in a rearward direction from tow vehicle 10. A first light source 22 that emits first colored light beam 18 and a second light source 24 that emits second colored light beam 20 are preferably positioned adjacent the rear 26 of tow vehicle 10 at opposing sides 28a, 28b of tow vehicle 10 such that first beam 18 and second beam 20 can be directed towards an intersecting point 30 rear of tow vehicle 10.

Referring also to FIG. 1B, a target location 32 is selected adjacent the front 34 of trailer 12 such that when intersecting point 30 meets target location 32, tow ball 14 on tow vehicle 10 and tow hitch 16 on trailer 12 are in exact position for engagement. Additionally, when intersecting point 30 meets target location 32, the intersection of first colored light beam 18 and second colored light beam 20 on a visible surface, such as target location 32, causes a third colored light to become visible at target location 32. For example, intersecting a blue colored light beam with a yellow colored light beam on a visible surface results in the emission of a green colored light. The emission of the third colored light signals to the driver that tow ball 14 on tow vehicle 10 and tow hitch 16 on trailer 12 are in the proper position for engagement. A substantially white strip of reflective material (not shown) is preferably placed over target location 32 to facilitate viewing the emission of the third colored light, especially in direct sunlight.

Intersecting point 30 is preferably located equidistant between the right side 36a and the left side 36b of trailer 12, but intersecting point 30 may be anywhere on the front 34 of trailer 12 as long as intersecting point 30 is within the boundaries formed by right side 36a and left side 36b of trailer 12 when trailer 12 is positioned approximately parallel and to the rear of tow vehicle 10, and intersecting point 30 is maintained at a consistent distance normal to rear of tow vehicle 10, as shown in FIG. 1B. The normal distance of intersecting point 30 from tow vehicle 10 represents the normal distance between rear 26 of tow vehicle 10 and front 34 of trailer 12, as determined by total horizontal length of the tow ball member 38 and the tow hitch member 40 when tow ball 14 and tow hitch 16 are engaged, also as shown in FIG. 1B.

A reflective horizontal strip (not shown) can be placed over target location 32 such that an "off-center" distance and direction between tow ball 14 and tow hitch 16 can be ascertained by the driver. When tow ball 14 and tow hitch 16 are off alignment, intersecting point 30 will be located on the horizontal strip either to the left or to the right off center, depending on whether tow vehicle 10 is to the left or right of trailer 12, respectively. This information enables the driver to makes the necessary corrective maneuvers to properly align tow ball 14 and tow hitch 16 for engagement.

Figure 2:
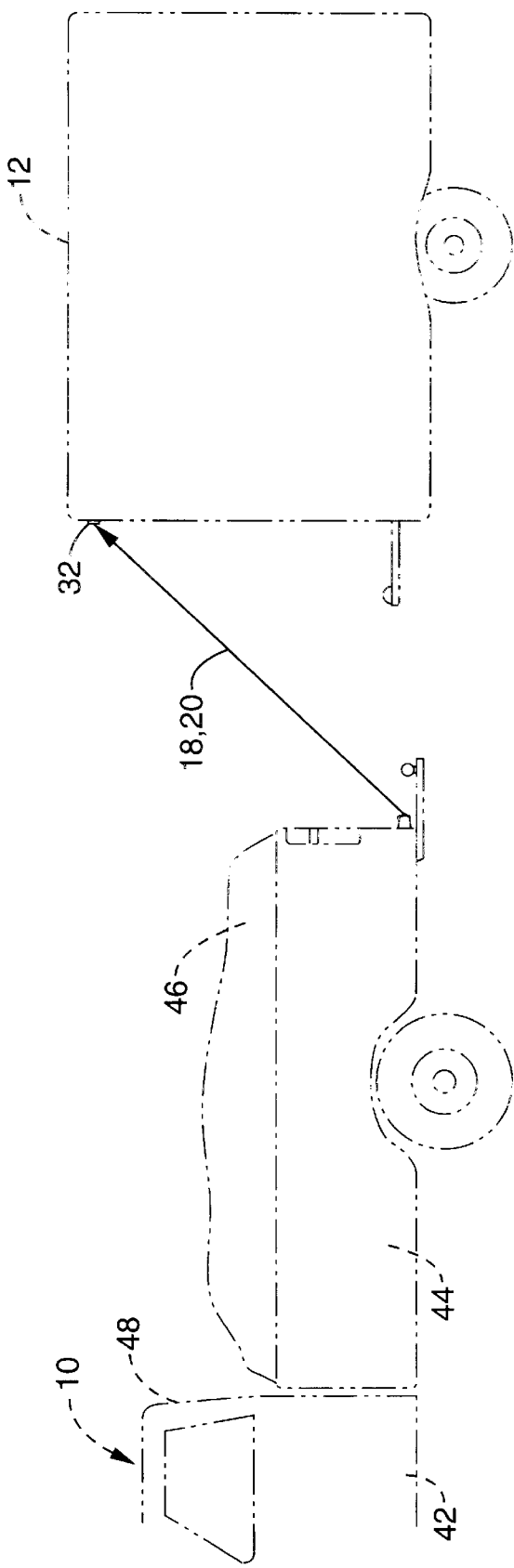
FIG. 2 is a side elevation schematic view of an optical emitter source used in the system of FIG. 1 mounted adjacent the rear of a tow vehicle.

Referring now to FIG. 2, colored light beams 18, 20 are directed at target location 32 at a point which offers the driver of tow vehicle 10 an unobstructed view of target location 32 while operating tow vehicle 10, especially when tow vehicle 10 is a pickup truck 42, as shown, with the bed 44 loaded with cargo 46. Target location should also be visible to driver through use of rear view mirrors.

Figure 3:
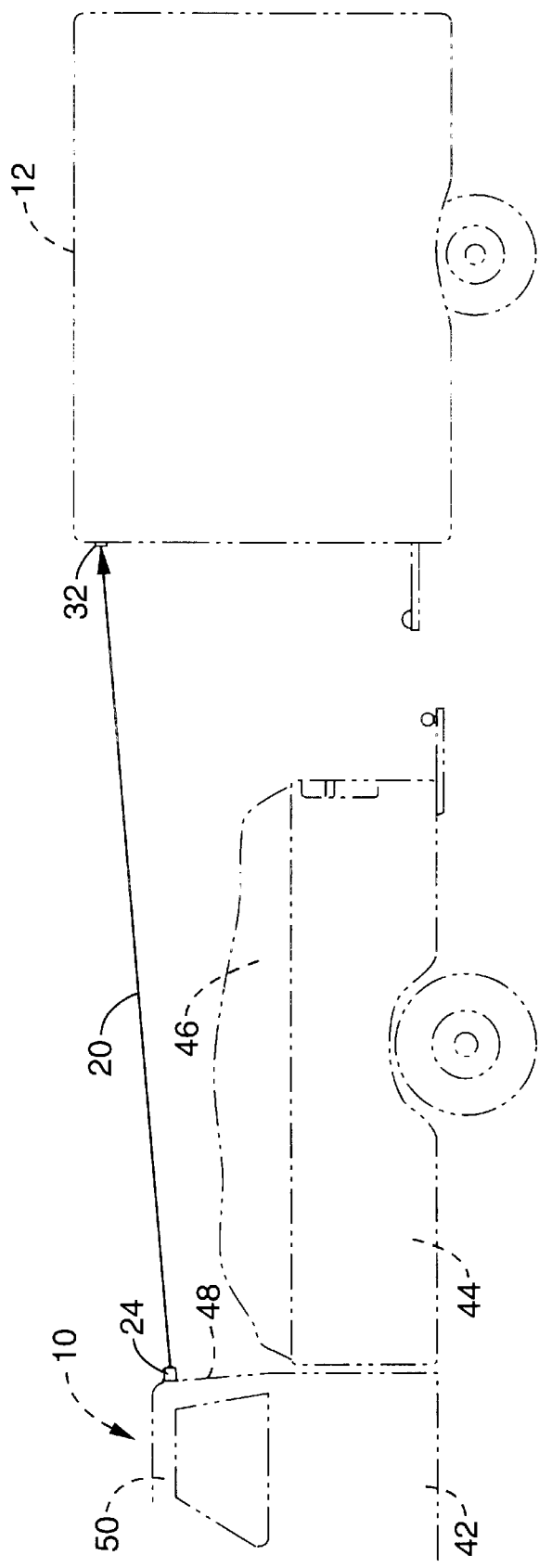
FIG. 3 is a side elevation schematic view of optical emitter source used in the system of FIG. 1. mounted adjacent the rear of a cab of a tow vehicle.

Referring also to FIG. 3, an alternate position is shown for light sources 22 (not shown), 24 located adjacent the rear 48 of a cab section 50 of a pickup truck or other tow vehicle 10, although numerous other positions for light sources 22, 24 are contemplated. Colored light beams 18, 20 are directed at target location 32 at a point which offers the driver of tow vehicle 10 an unobstructed view of target location 32 while operating tow vehicle 10.

Figure 4:
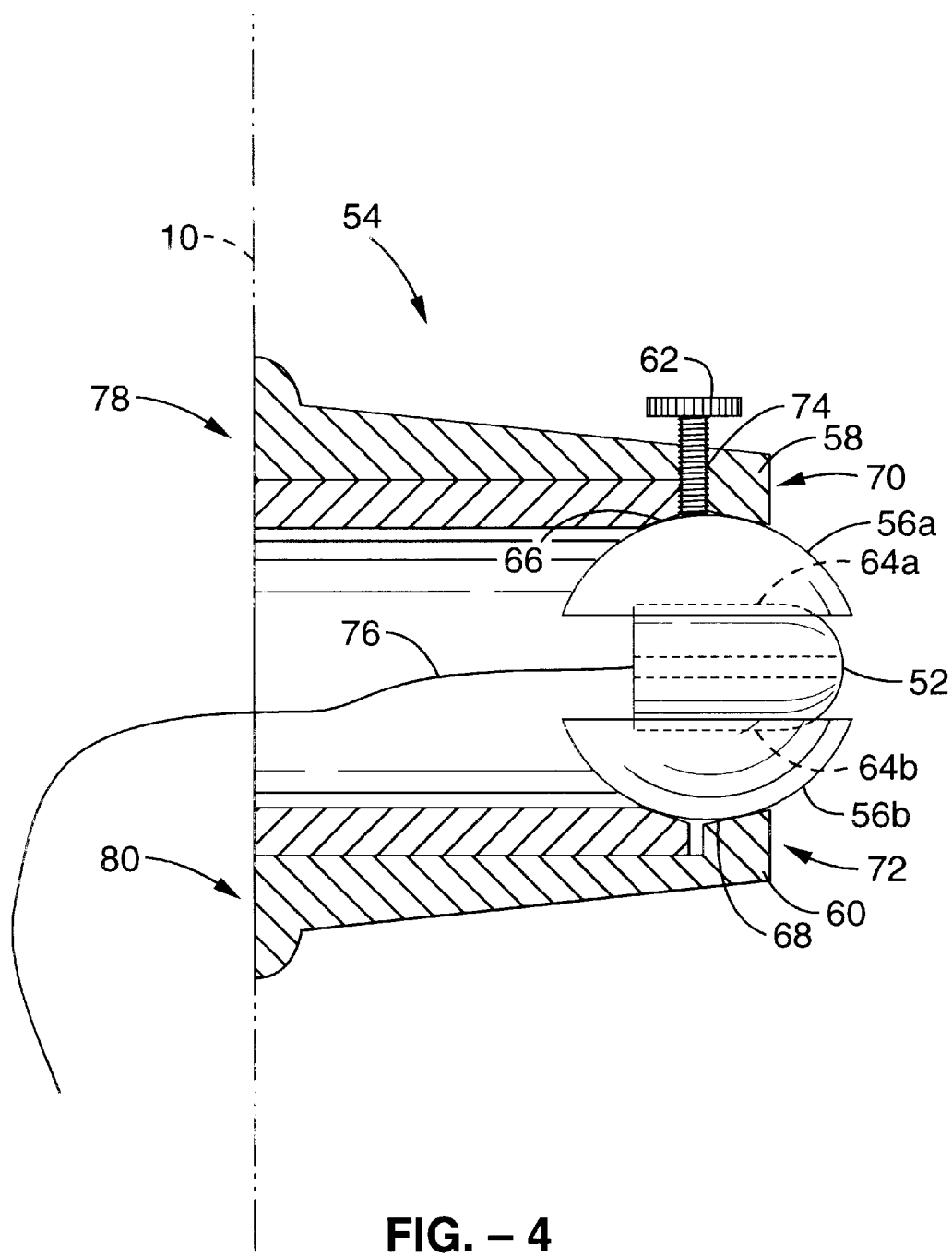
FIG. 4 is side elevation view of one type of optical emitter source used in the system of FIG. 1 coupled to a mounting bracket shown in cross-section.

Referring now to FIG. 4, the preferred embodiment of light sources 22, 24 is a laser beam emitter 52. Laser beam emitter 52 is mounted in a housing assembly 54 which comprises a pair of semi-spherical ball sections 56a, 56b, an upper arm 58, a lower arm 60 and a threaded knob 62. Laser beam emitter 52 is positioned between semi-spherical ball sections 56a, 56b. Each ball section 56a, 56b contains a socket 64a, 64b therein where laser beam emitter 52 is nestled and remains stationary relative to ball sections 56a, 56b. Arms 58, 60 serve to grip ball sections 56a, 56b. Upper arm 58 has a spherical recess 66 and lower arm 60 has a spherical recess 68 adjacent the distal ends 70, 72 of arms 58, 60, respectively. Spherical recesses 66, 68 are configured to receive ball sections 56a, 56b therein, respectively and allow ball sections 56a, 56b to be directionally oriented within spherical recesses 66, 68. Ball sections 56a, 56b can be locked in position by threaded knob 62 screwed into a threaded hole 74 in upper arm 58 adjacent spherical recess 66 to tighten ball section 56a against laser beam emitter 52. Laser beam emitter 52 is supplied with electrical power from a voltage source, such as an automotive battery (not shown) through a wire 76. Alternatively, laser emitter 52 may contain an internal battery (not shown), eliminating the need for electrical power from external sources. A switch (not shown) located within the driver's compartment is wired in series between the battery and laser beam emitter 52 to allow for remote activation of laser beam emitter 52. The proximate end 78 of upper arm 58 and the proximate end 80 of lower arm 60 are securely attached to tow vehicle 10 by any known and practical means.

Figure 5:
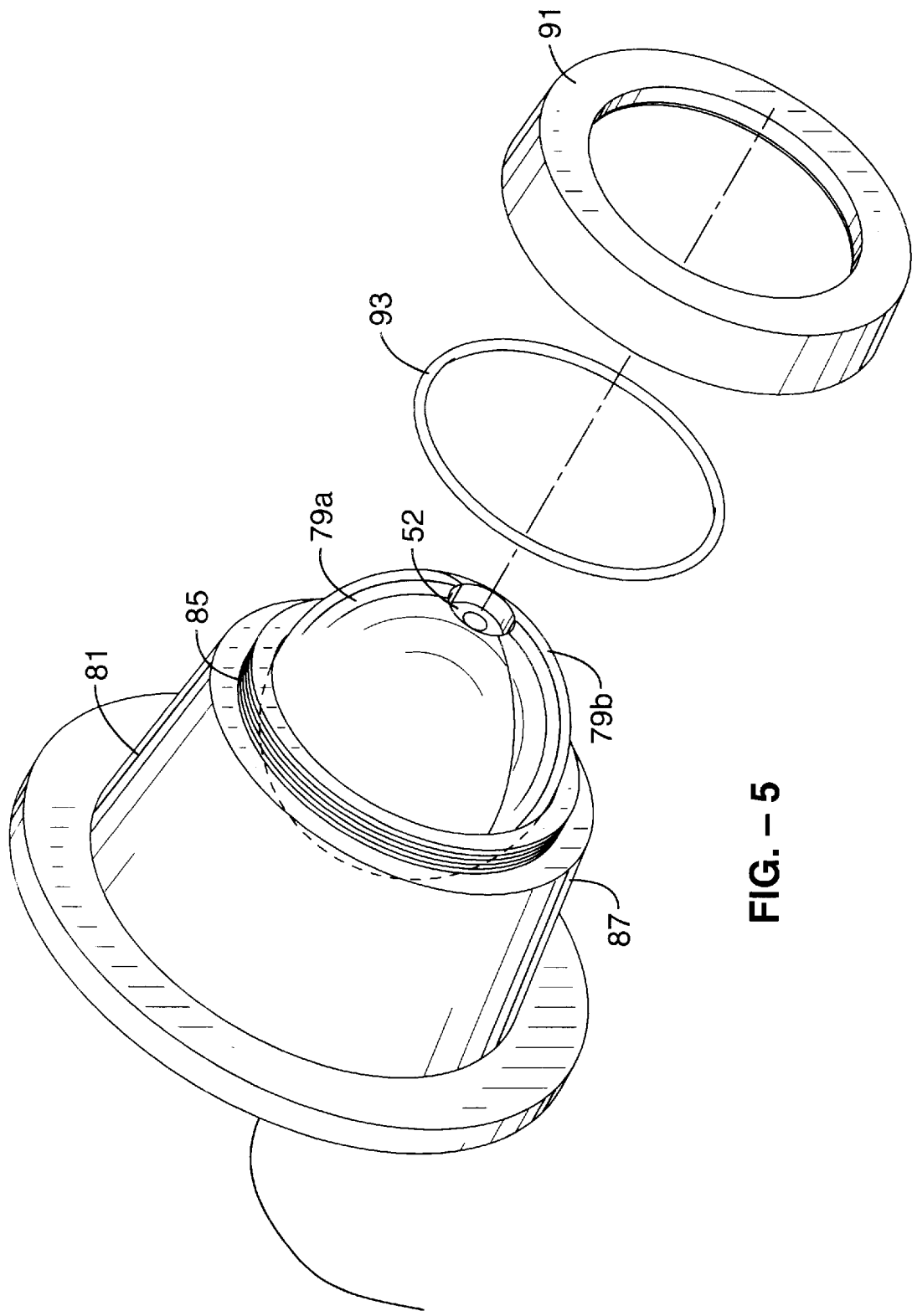
FIG. 5 is a perspective view of an alternate embodiment of an optical emitter source used in the system of FIG. 1 coupled to a mounting bracket.
Figure 6:
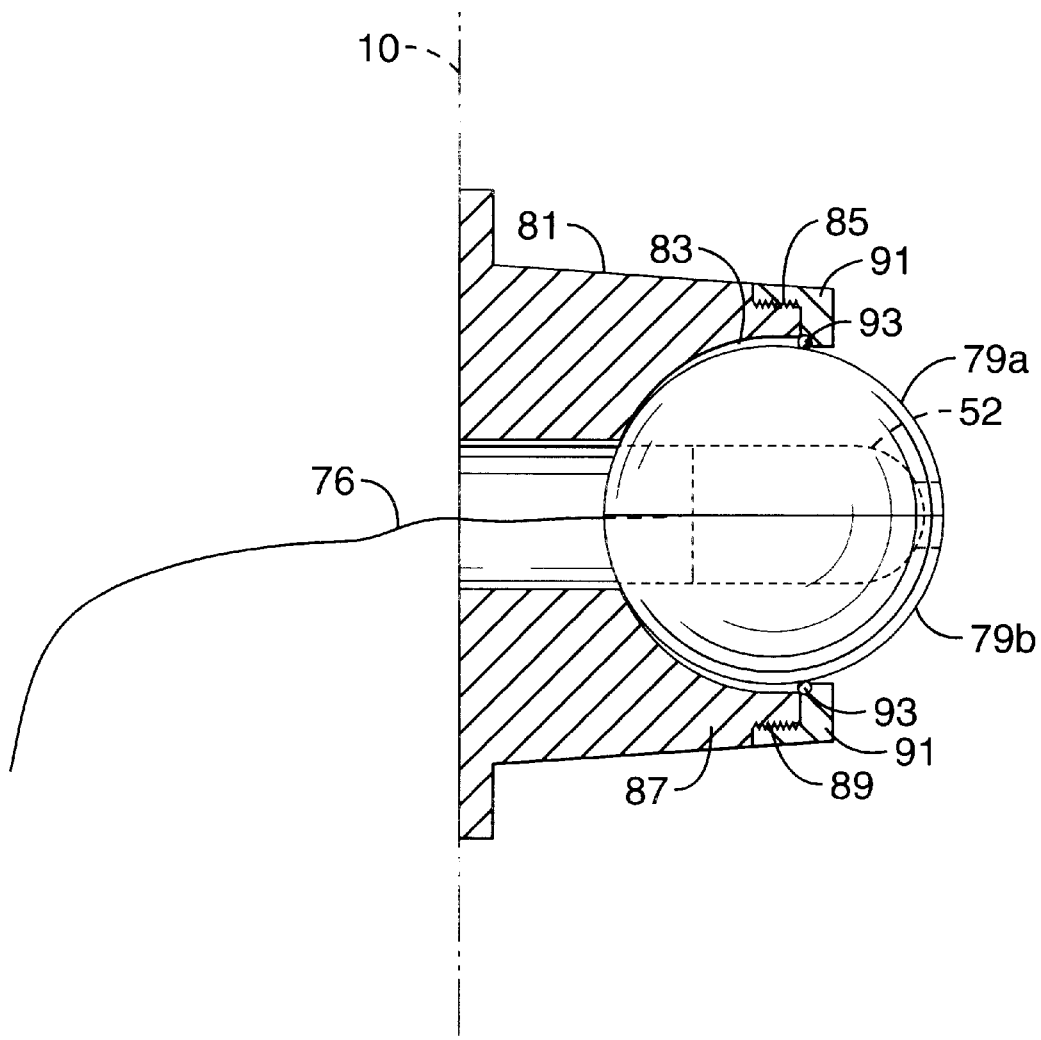
FIG. 6 is a side elevation view of an optical emitter source and mounting bracket of FIG. 5 shown in cross-section.

FIG. 5 and FIG. 6 show an alternate embodiment by which laser beam emitter 52 and ball sections 79a, 79b can be attached to tow vehicle 10. A base 81 having a partially spherical recess 83 sized to accommodate laser beam emitter 52 and ball sections 79a, 79b is attached to tow vehicle 10. External threads 85 are located around the circumference of the distal end 87 of base 81. External threads 85 are adapted to threadably receive internal the threads 89 of a cap 91. Cap 91 when screwed over base 81 securely fastens laser beam emitter 52 and ball sections 79a, 79b within base 81. An O-ring 93 positioned between ball sections 79a, 79b, cap 91 and distal end 87 of base 81 cushions ball sections 79a, 79b against base 81 and cap 91 and also provides a leak-proof seal therein. Loosening cap 91 allows for directional adjustment of laser beam emitter 52, and tightening cap 91 affixes laser beam 52 emitter in place.

Other sources of generating colored light beams 18, 20 are contemplated, examples of which may include but are not limited to, incandescent light directed through a collimator or an LED. Any light source 22, 24 contemplated, however, must be capable of generating a highly collimated colored visible beam of light when the beam strikes a visible surface, such target location 32 on trailer 12, thus causing the emission of a third colored light due to the intersecting of two light beams of differing colors.

Figure 7:
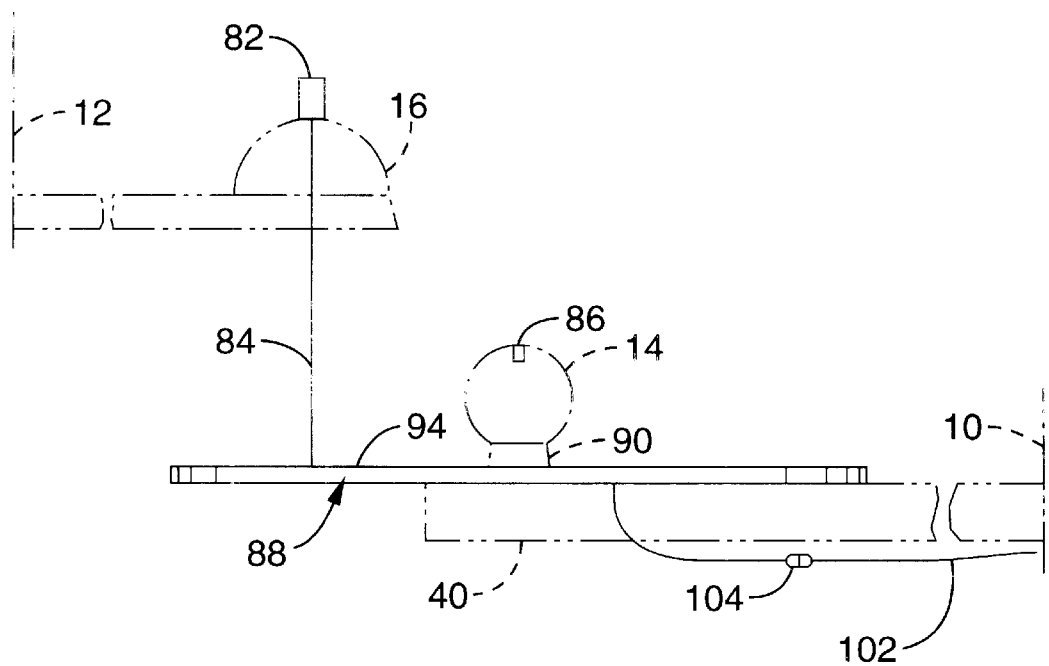
FIG. 7 is side elevational view of an alternate embodiment of an optically guided trailer hitching system in accordance with the present invention showing a tow vehicle and trailer in position to be hitched.
Figure 8:
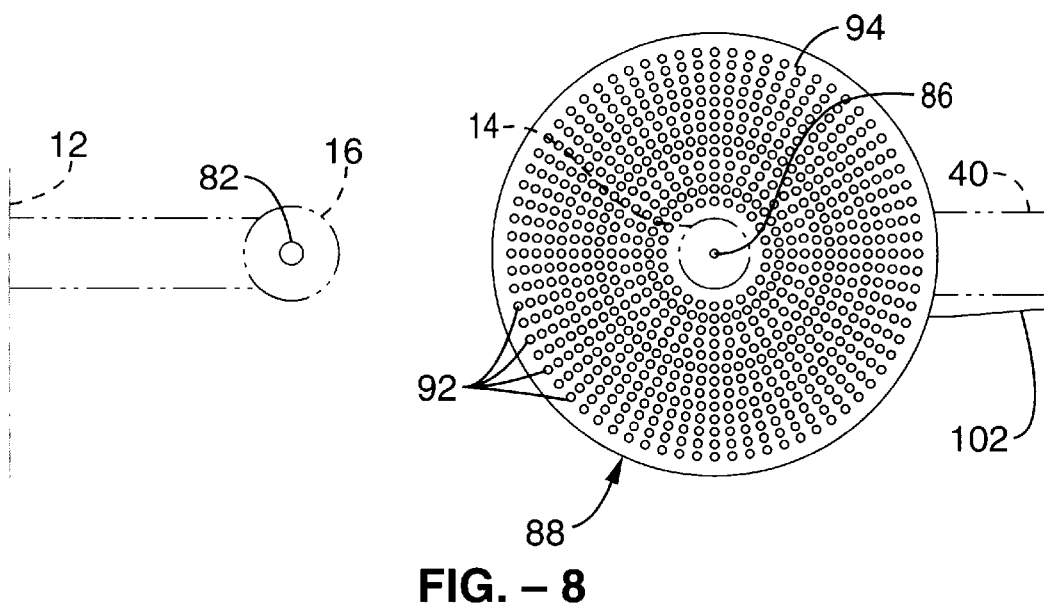
FIG. 8 is top plan view of the optically guided trailer hitching system of FIG. 7 shown in relation to a tow vehicle and trailer in position to be hitched.
Figure 9:
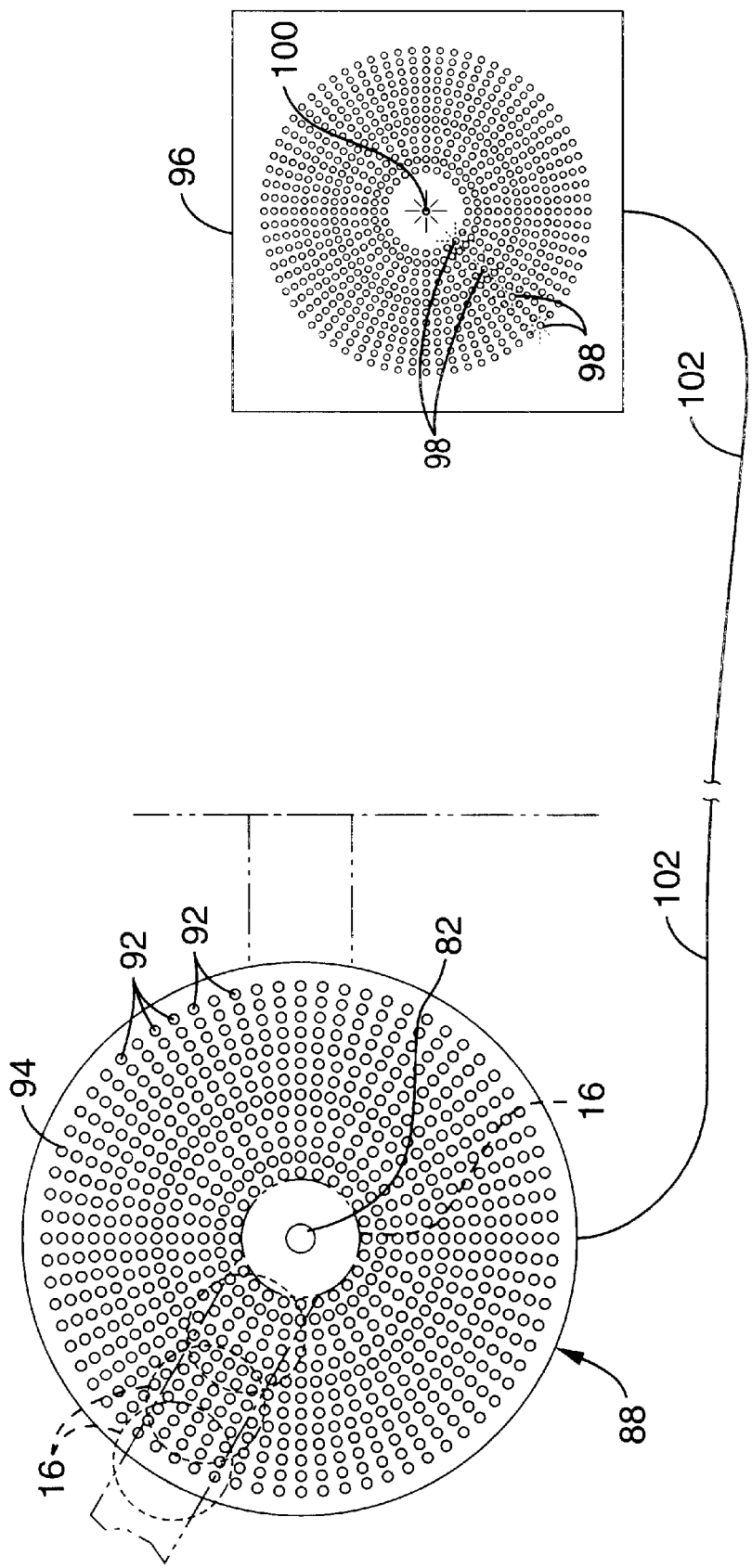
FIG. 9 is a diagrammatic view of the optically guided trailer hitching system shown in FIG. 7 connected to a display panel.

Referring now to FIG. 7 through FIG. 9, an alternate embodiment of the invention is shown. A laser emitter 82 is placed adjacent tow hitch 16 of trailer 12. Laser emitter 82 is arranged in a pre-focused position, preferably such that the laser beam 84 is directed vertically downward. A primary photoelectric sensor 86 is placed adjacent tow ball 14 on tow vehicle 10. A horizontally-disposed sensor plate 88 generally surrounds tow ball 14. Sensor plate 88 is removably attached to either tow ball shank 90, tow ball member 40 or any combination thereof. Although a circular disk is shown, any configuration that provides a flat horizontal surface will suffice.

A plurality of auxiliary photoelectric sensors 92 are disposed on the upper surface 94 of sensor plate 88 in an arrangement such that when laser beam 84 is shining on any part of upper surface 94 of sensor plate 88, laser beam 84 will strike at least one auxiliary sensor 92. Auxiliary sensor 92 and primary sensor 86 are activated whenever struck by laser beam 84, whereby a signal is then transmitted to a remote display panel 96 which is preferably located within the driver's compartment. Display panel 96 comprises a plurality of LED's 98 which illuminate as sensors 86, 92 are activated by laser beam 84. Each LED 98 corresponds to a particular auxiliary sensor 92 with the center LED 100 corresponding to primary sensor 86. Accordingly, activation of center LED 100 indicates that tow ball 14 and tow hitch 16 are in proper position for engagement, as shown in FIG. 7. The signals from primary sensor 86 and auxiliary sensors 92 are transmitted through a wire 102 with a detachable plug 104 which allows for the removal of sensor plate 88 from tow vehicle 10 as necessary.

In use, primary sensor 86, auxiliary sensors 92 and laser emitter 82 are activated. As tow vehicle 10 approaches trailer 12 for engagement of tow ball 14 with tow hitch 16, laser beam 84 must first strike upper surface 94 of sensor plate 88, activating one or more auxiliary sensors 92. This causes auxiliary sensors 92 to transmit signals to display panel 96, thus lighting corresponding LED's 98 and providing information to the driver as to the relative distance and direction between tow ball 14 and tow hitch 16, since each auxiliary sensor 92 corresponds to a particular LED 98 on display panel 96. With the visual information, the driver then simply has to maneuver tow vehicle 10 while observing display panel 96 so that LED's 98 begin lighting in sequential fashion propagating towards center LED 100. When center LED 100 on display panel 96 is activated, tow ball 14 and tow hitch 16 are in proper position for engagement.

It is contemplated that the invention is also applicable to truck docking during loading and unloading of cargo, forklift warehouse operations, airport cargo towing and positioning, airplane towing and positioning, alignment of precision machinery in manufacturing operations, cargo loading onto trailers or trains or any other process requiring repetitive positioning.

Accordingly, it will be seen that in one embodiment of this invention, a pair of different colored light beams intersect to form a third colored light on a visible surface to provide immediate visual feedback to the driver of a tow vehicle while attempting to align and couple the hitching components of the tow vehicle and a trailer. It will also be seen that in an alternate embodiment of this invention, a light beam directed at a sensor plate provide feedback via a display panel to the driver regarding relative distance and direction of the hitching components of the tow vehicle and a trailer. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A trailer hitching guide system for vehicles having tow hitching means to couple a trailer to a tow vehicle, comprising:
   (a) a first optical source capable of emitting an optical beam of a first color, said first colored optical beam being emitted towards a trailer vehicle; and
   (b) a second optical source capable of emitting an optical beam of a second color, said second colored optical beam being emitted towards said trailer vehicle;
   (c) wherein said first and said second optical source are located on said tow vehicle and aligned such that when said first colored optical beam and said second colored optical beam intersect at a target location on said trailer vehicle, a light emission of a third color is produced at said target location and said hitching means are in alignment to couple said trailer vehicle to said tow vehicle.

2. A system as recited in claim 1, wherein said target location comprises a reflective surface.

3. A system as recited in claim 2, wherein said reflective surface extends horizontally.

4. A system as recited in claim 1, wherein said first and said second optical source is mounted on said tow vehicle using a ball and socket means for allowing multi-axial directional adjustment of said optical sources.

5. A method for hitching a trailer vehicle to a tow vehicle using a system recited in claim 1, comprising the steps of:
   (a) activating said first and said second optical source;
   (b) backing said tow vehicle towards said trailer vehicle;
   (c) monitoring said target location on said trailer vehicle while performing said backing step;
   (d) maneuvering said tow vehicle as necessary to cause alignment of said first and said second optical beams on said target location; and
   (e) stopping said tow vehicle when said first optical beam and said second optical beam intersect at said target location.

6. A trailer hitching guide system for vehicles having tow hitching means to couple a trailer to a tow vehicle, comprising:
   (a) a first optical source capable of emitting a first colored optical beam, said first colored optical beam being emitted towards said trailer vehicle; and
   (b) a second optical source capable of emitting a second colored optical beam, said second colored optical beam being emitted towards said trailer vehicle;
   (c) wherein said first and said second optical source are located on said tow vehicle and aligned such that when said first colored optical beam and said second colored optical beam intersect at a target location on said trailer vehicle, a light emission of a third color is produced; and
   (e) wherein said first and said second optical source are located on said tow vehicle and aligned such that when said first colored optical beam and said second colored optical beam intersect at a target location on said trailer vehicle, said hitching means are in alignment to couple said trailer vehicle to said tow vehicle.

7. A system as recited in claim 6, wherein said target location comprises a reflective surface.

8. A system as recited in claim 7, wherein said reflective surface extends horizontally.

9. A method for hitching a trailer vehicle to a tow vehicle using a system recited in claim 6, comprising the steps of:
   (a) activating said first and said second optical source;
   (b) backing said tow vehicle towards said trailer vehicle;
   (c) monitoring said target location on said trailer vehicle while performing said backing step;
   (d) maneuvering said tow vehicle as necessary to cause alignment of said first and said second colored optical beams on said target location; and
   (e) stopping said tow vehicle when said first colored optical beam and said second colored optical beam intersect together at said target location and produces said light emission of said third color.

* * * * *